R. W. Leach & W. H. Bateman
INVENTORS

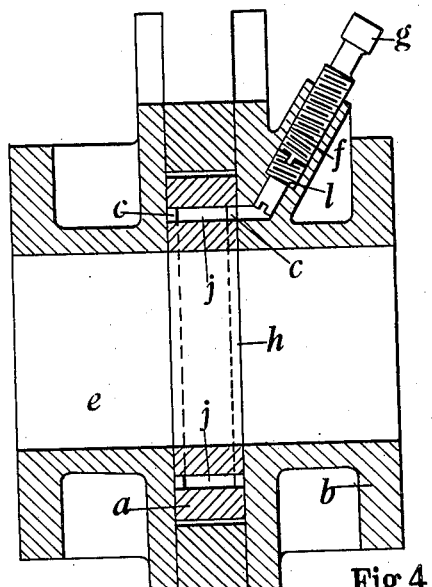
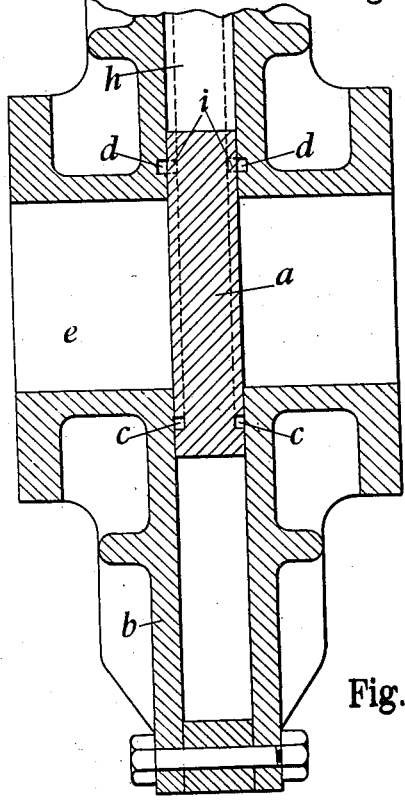
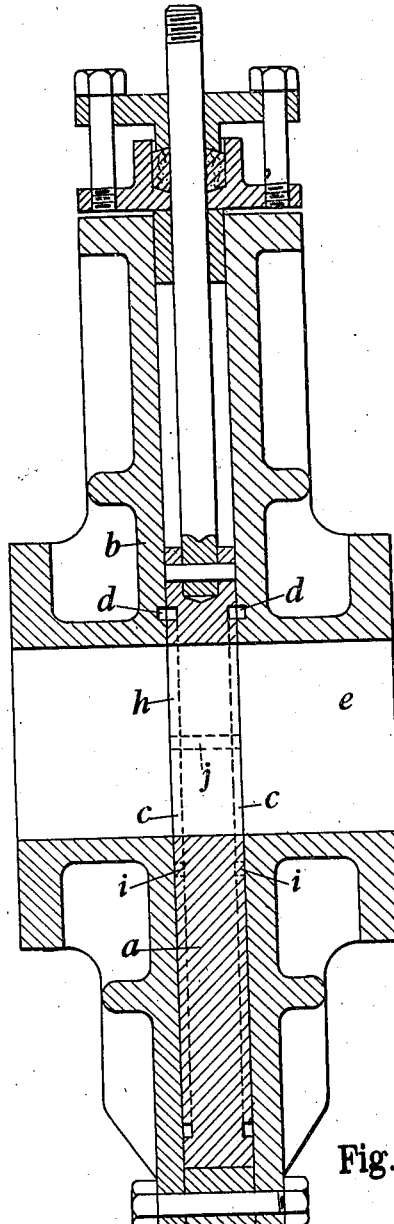

Nov. 4, 1930.  R. W. LEACH ET AL  1,780,828
VALVE
Filed Jan. 17, 1929  4 Sheets-Sheet 3

R. W. Leach & W. H. Bateman
INVENTORS

Nov. 4, 1930.      R. W. LEACH ET AL      1,780,828
VALVE
Filed Jan. 17, 1929      4 Sheets-Sheet 4

R. W. Leach & W. H. Bateman
INVENTORS

Patented Nov. 4, 1930

1,780,828

UNITED STATES PATENT OFFICE

ROBERT WILLIAM LEACH AND WILLIAM HENRY BATEMAN, OF NEWPORT, ENGLAND

VALVE

Application filed January 17, 1929, Serial No. 333,072, and in Great Britain January 21, 1928.

This invention relates to valves of the sliding plate or rotary disc type. In such valves relatively broad surfaces are presented to each other between the fixed and movable parts. Such surfaces can be made to lie in close contact with each other by accurate machining and grinding operations, but however well these surfaces may be fitted together some additional means are usually necessary to insure a fluid tight joint between them. The object of the present invention is to enable a fluid tight joint to be obtained in a very simple and convenient manner, as well as adequate lubrication of the contacting surfaces.

The invention comprises the provision in the fixed and movable parts of the valve, of lubricant distributing channels into which a viscous lubricant is supplied under pressure, some of the channels being arranged to surround the ports or passages in the valve, and the formation or disposition of the channels so that some of them are put out of communication with the source of supply when the movable part of the valve is being moved from one position to another.

In the four accompanying sheets of explanatory drawings:—

Figure 2 is a sectional side elevation of the valve in the open position, and Figure 3 is a sectional side elevation of the lower portion of the valve in the closed position.

Figure 4 is a cross section on the line 1—2, Figure 1.

Figure 1:
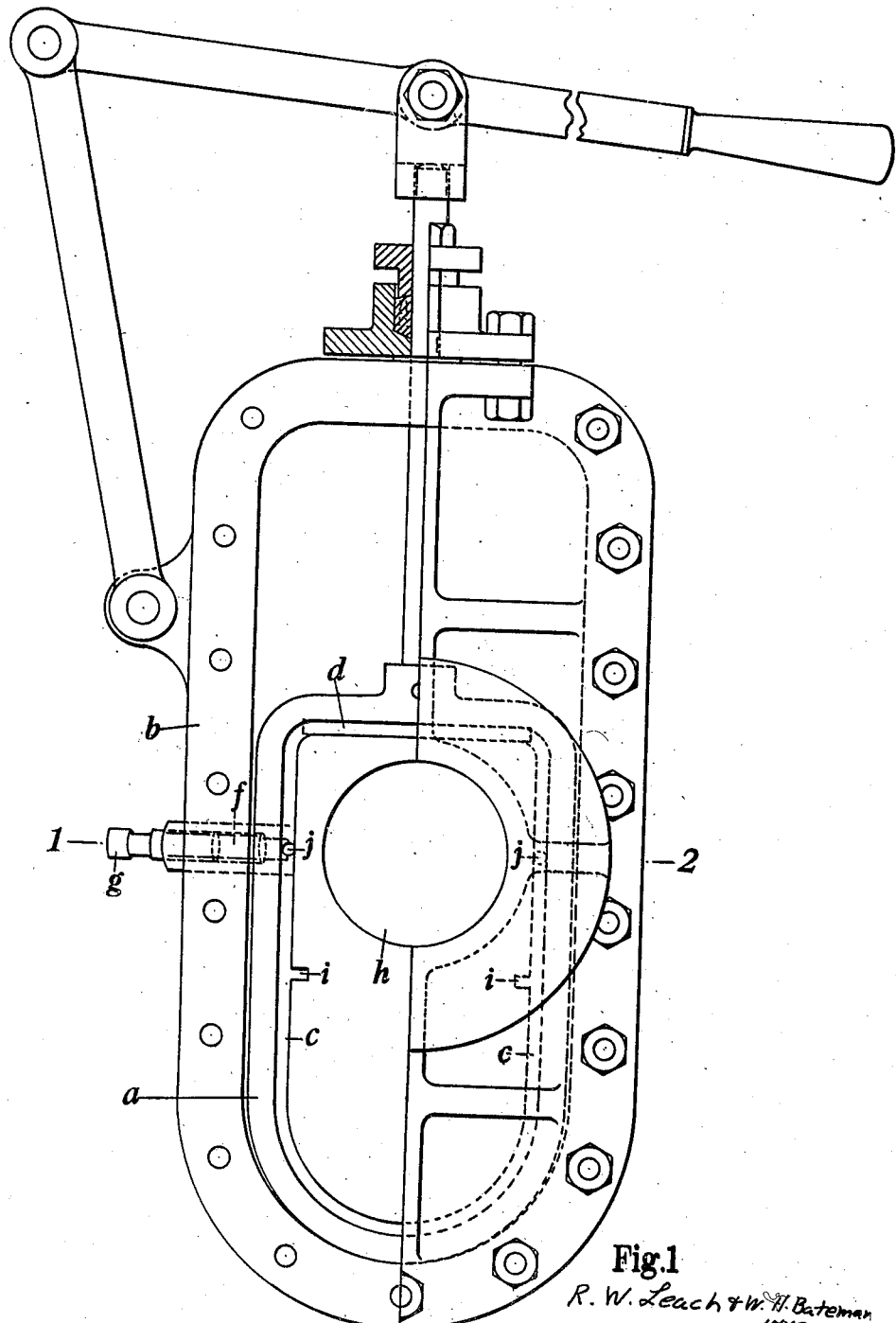
Figure 1 is a front elevation with one half in section of a sliding plate valve provided with lubricating means in accordance with this invention.

In the application of the invention as shown in Figures 1–4 to a valve in which a slidable plate $a$ is mounted within a fixed body $b$, a continuous lubricant groove $c$ is formed in each face near the edge of the plate, and transversely across each adjacent face of the body is formed another lubricant groove $d$. The relative disposition of the grooves in the fixed and movable parts is such that a continuous channel containing lubricant under pressure is located around the main passage $e$ through the valve when the valve is closed, and this ring of lubricant serves to maintain a fluid tight joint. Lubricant is supplied to the channels in the movable part from a small chamber $f$ contained in the body of the valve, the lubricant in this chamber being put under pressure by means of a screw $g$ or by a piston acted on by a spring or by fluid pressure. If desired a small non-return valve may be provided in a fitting $l$ at the inner end of the chamber $f$. During the movement of the valve from the closed position shown in Figure 3 to the open position shown in Figures 1, 2 and 4, the channels $d$ in the body are exposed for a time by the aperture $h$ in the movable member. During this period the ends of the body channels $d$ do not communicate with the channels in the movable member and consequently no material leakage of lubricant occurs from the body channels during the interval of exposure. When the valve is fully open communication with the body channels is re-established by the fact that the channels in the fixed and movable parts come opposite each other.

To enable communication to be established between the channels $c$ and $d$ when the valve is closed short lateral branches $i$ are formed in the passages in the movable member, which branches coincide with the ends of the body channels $d$ when the valve is closed. To enable lubricant to pass from the chamber $f$ to both sides of the valve a hole $j$ is formed in the valve in communication with the grooves or channels $c$ on both sides of the valve.

Sometimes a cleaning door is provided in the body of the valve which can expose the aperture in the movable member when the valve is closed. When such a door is used, the disposition of the various lubricant channels above described serves to surround both the main passage $e$ and the opening in the body which is normally covered by the cleaning door.

The application of the invention to rotary valves in which a disc can be rotated or oscillated in a fixed body and in which segmental apertures are formed, is essentially the same as that above described. One example is shown diagrammatically at Figures 5 and 6. The main body part comprises a pair of stationary disc like members $m$ formed with a number of apertures $n$ for the flow of fluid. Adjacent to one edge of each of such apertures is formed a radial groove $o$ for lubricant. One or more of such grooves may be supplied from any suitable lubricant reservoir arranged in combination with the body part. It will be noticed that the grooves $o$ do not extend completely across the flat face of the member $m$. Between a pair of such members is arranged a rotary disc $p$ formed with apertures $q$ which can be brought into coincidence with or moved away from the apertures $n$ in the body part. Any convenient means may be employed for imparting an angular movement to the part $p$. In this example it is intended that the disc $p$ shall receive only a limited angular movement sufficient in either direction of rotation to bring the aperture $n$, $q$ opposite or away from each other. It is not intended that the disc should be capable of being moved through a complete revolution. In each face of the movable disc $p$ is formed an outer circular groove $r$ and an inner circular groove $s$, these being joined by radial grooves $t$. Also short radial grooves $u$, $v$ are arranged in communication with the grooves $r$ and $s$ respectively. The function of the short grooves $u$, $v$ is to effect connections with the ends of the stationary grooves $o$ in the body part. The grooves on the two sides of the disc $p$ are joined up, one or more holes passing through the disc. Assuming that the apertures $q$ are opposite the apertures $n$, then the radial grooves $t$ coincide with the radial grooves $o$ and all the grooves can receive lubricant under pressure from the source of supply. Further, each aperture is surrounded by a seal of lubricant material, though owing to the disposition of the radial grooves the seal is at some distance from one edge of each aperture, whilst it is close up to the other edge. Nevertheless, each aperture is surrounded. When the disc $p$ is moved for interrupting the flow of fluid through the apertures $n$, $q$, that is to say, when the apertures $q$ lie opposite blank portions of the body parts $m$, the short radial grooves $u$, $v$ join up with the radial grooves $o$ and the radial grooves $t$ then lie close alongside the opposite edges of the apertures to the grooves $o$. In other words, when the valve is closed, each aperture $n$ is surrounded by immediately adjacent grooves containing lubricant which serves to maintain an effective joint or seal between the parts.

Figure 5:
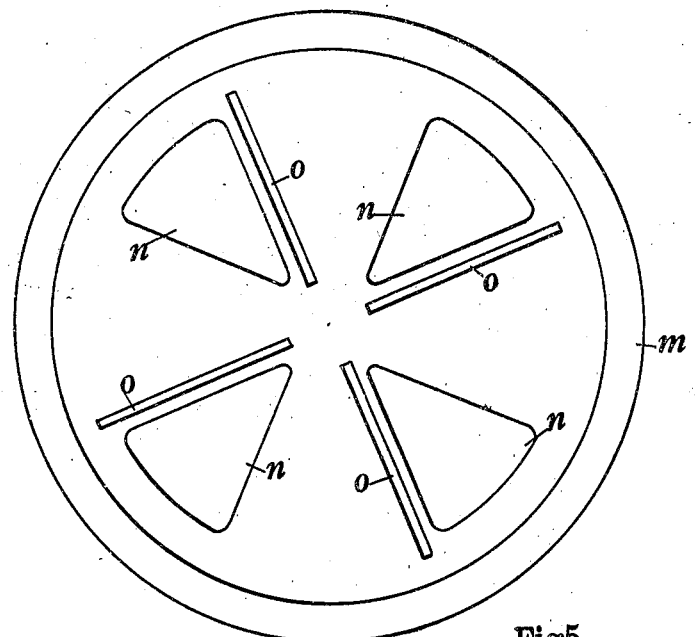
Figures 5 and 6 illustrate diagrammatically one application of our invention to rotary disc valves.
Figure 6:
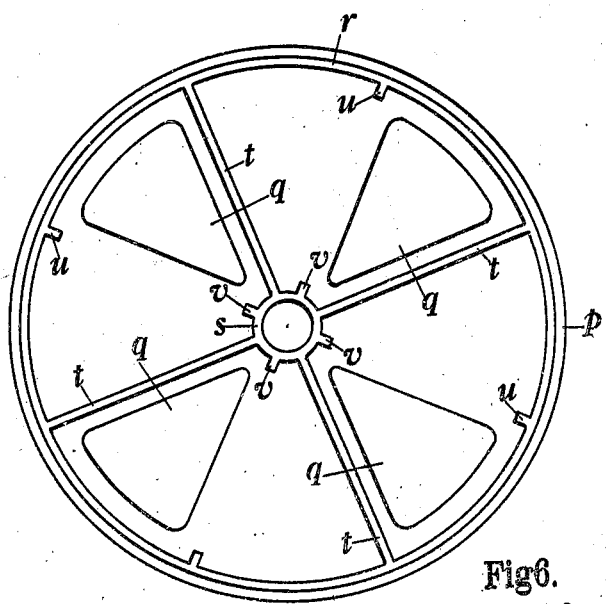
Figure 7:
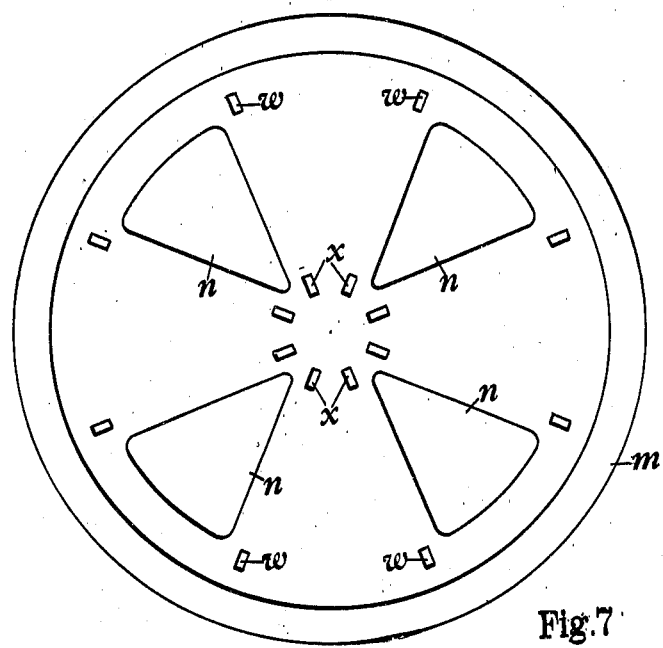
Figures 7 and 8 show another application to such valves.
Figure 8:
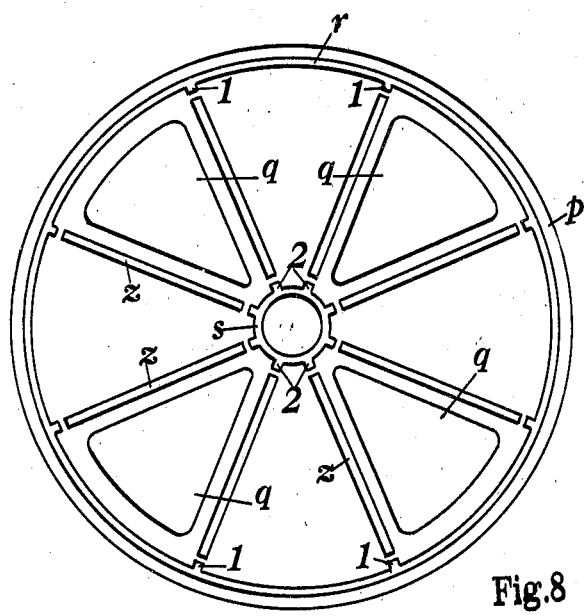

The example shown in Figures 7 and 8 is essentially the same as that shown in Figures 5 and 6, the differences being found in the disposition of the lubricant grooves. In the fixed body parts $m$ short radial grooves $w$, $x$ are arranged near the centre and the outer part of the flat faces of the body portions $m$, and any one or more of these is in communication with the source of supply. The rotatable disc $p$ is formed on each side with an outer circular groove $r$, an inner circular groove $s$, radial grooves $z$, and short radial grooves 1, 2, communicating with the grooves $r$ and $s$ respectively. It will be noticed that the radial grooves $z$ do not communicate with the short radial grooves 1, 2. The required communication is effected by means of the short radial grooves $w$, $x$ in the body parts. In this example each aperture $n$, when the valve is either opened or closed, is surrounded by an immediately adjacent seal of lubricant material, but as in the example shown in Figures 5 and 6, during the transition from the open to the closed position, the grooves in the disc $p$ pass out of communication with the grooves $w$, $x$ so that no escape of lubricant from the radial grooves $z$ can occur during such movement. The valve illustrated by Figures 7 and 8 differs also from that illustrated at Figures 5 and 6 in that the parts $p$ can receive a complete rotational movement without allowing escape of lubricant from any of the grooves.

It will be apparent that the invention is capable of being carried out in a variety of different ways, but in all cases the essential conditions to be satisfied are the same as those above described.

Having thus described our invention what we claim as new and desire to secure by Letters Patent is:—

1. In valves of the sliding plate type, a fixed part having a passage therein, a slidable plate part having an aperture therein, lubricant distributing channels situated in the adjacent faces of the fixed and slidable parts, and means for supplying lubricant to the channels under pressure, said channels surrounding said passage and certain of said channels being put out of communication with the lubricant supply means when the slidable part of the valve is being moved from one position to another.

2. In valves of the sliding plate type, fixed and slidable plate parts having working faces, a continuous lubricant distributing channel in one of the working faces, relatively short branch channels opening into said distributing channel, and a complementary channel in the other working face adapted to communicate with the ends of the branch channels.

3. In valves of the rotary disc type, a fixed part having a passage therein, a rotary disc part having an aperture therein, lubricant distributing channels situated in the adjacent faces of the fixed and rotatable parts, the channels being adapted for connection with a supply of lubricant under pressure, said channels surrounding said passage and certain of the channels being put out of communication with the lubricant supply means when the rotatable part of the valve is being moved from one position to another.

4. In valves of the rotary disc type, fixed and rotary disc parts having working faces, a continuous lubricant distributing channel in one of the working faces, relatively short branch channels opening into said distributing channel, and a complementary channel in the other working face adapted to communicate with the branch channels.

5. In a valve, a body part having a passage therein, a part movable in the body part and also having a passage, lubricant distributing channels adapted for connection with a supply of lubricant under pressure situated in the adjacent faces of the two parts, said channels surrounding said passage and certain of the channels being put out of communication with the lubricant supply means when the movable part is being moved from one position to another.

In testimony whereof we have signed our names to this specification.

ROBERT WILLIAM LEACH.
WILLIAM HENRY BATEMAN.